United States Patent [19]

Gross et al.

[11] Patent Number: 4,973,340
[45] Date of Patent: Nov. 27, 1990

[54] METHOD OF REMOVING HYDROSULFIDE FROM PARTIAL OXIDATION GAS

[75] Inventors: Manfred Gross, Gladbeck; Ulrich Meisl, Essen, both of Fed. Rep. of Germany

[73] Assignee: Krupp Koppers GmbH, Essen, Fed. Rep. of Germany

[21] Appl. No.: 448,019

[22] Filed: Dec. 8, 1989

[30] Foreign Application Priority Data

Dec. 14, 1988 [DE] Fed. Rep. of Germany ....... 3842005

[51] Int. Cl.⁵ ............................................ B01D 19/00
[52] U.S. Cl. .......................................... 55/48; 55/49; 55/68; 55/73; 423/229
[58] Field of Search ................... 55/48, 49, 56, 68, 73, 55/42, 43; 423/228, 229

[56] References Cited

U.S. PATENT DOCUMENTS 3,266,220  8/1966  Woertz ...................................... 55/68
4,198,378  4/1980  Giammarco et al. ............... 423/229
4,869,884  9/1989  Riggs ....................................... 55/68

OTHER PUBLICATIONS

Gwf-Gas/Erdgas, 121 (1980), Heft 12, Seite 545, Bild 3.

Primary Examiner—Bernard Nozick
Attorney, Agent, or Firm—Michael J. Striker

[57] ABSTRACT

A method of removing hydrosulfide from a crude gas produced by partial oxidation of carbon-containing material comprises the steps of treating a gas at a temperature between 10° and 60° C. with a suitable absorption solution, regenerating the absorption solution loaded durhg the treating, and cooling the crude gas which has been precleaned and pre-cooled to a temperature of 110°–150° C. before entering the absorption column, in a stepped manner in indirect heat exchange, the cooling including supplying the gas first through a reboiler of a desorption column and then through a heat exchanger which serves for preheating of the loaded absorption solution.

5 Claims, 1 Drawing Sheet

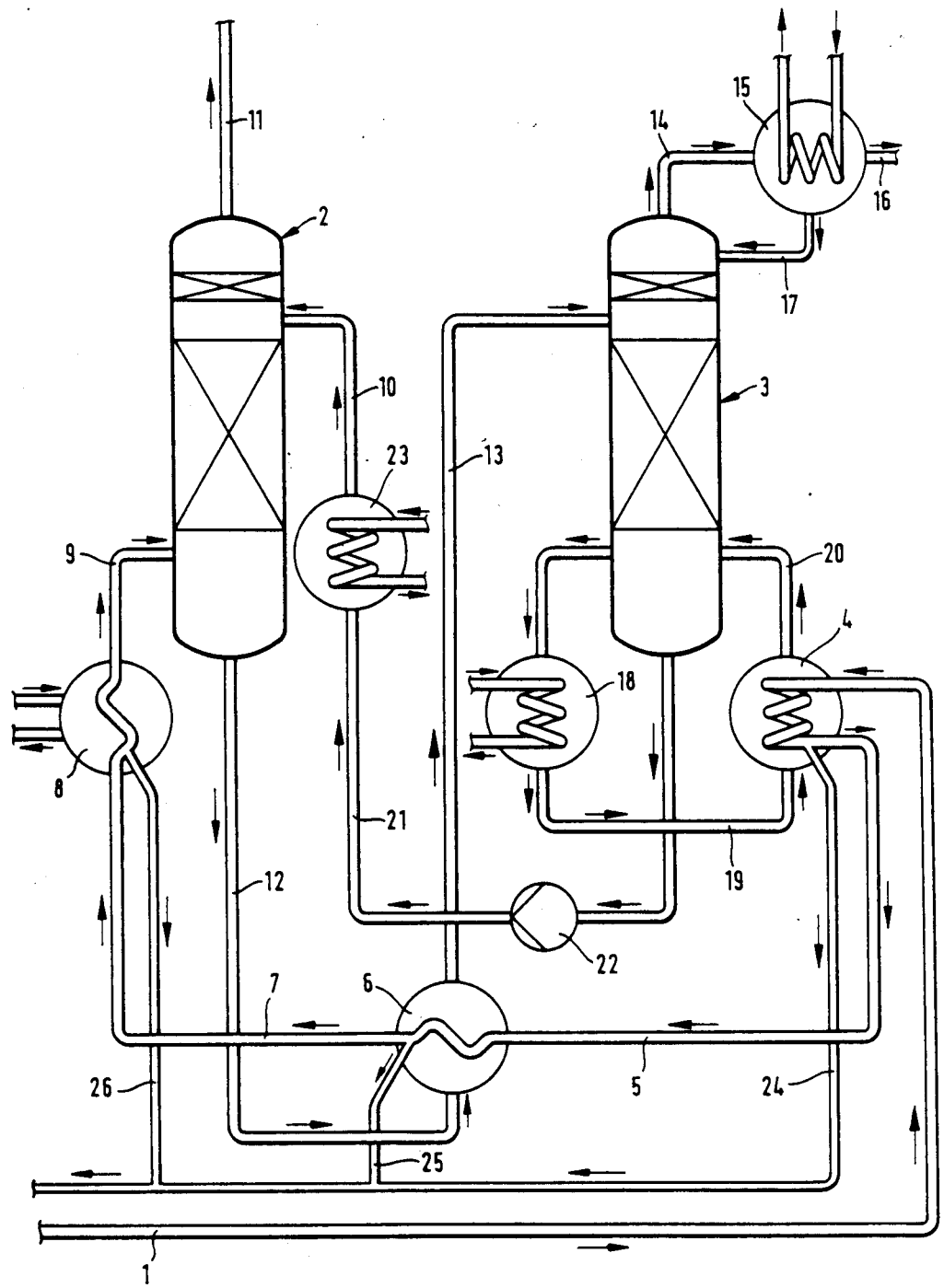

METHOD OF REMOVING HYDROSULFIDE FROM PARTIAL OXIDATION GAS

BACKGROUND OF THE INVENTION

The present invention relates to a method of removing hydrosulfide from partial oxidation gas. More particularly, it relates to a method of removing hydrosulfide from a crude gas produced by partial oxidation (gasification) of carbon containing material, and particularly such a method in which the gas is treated at a temperature between 10° and 60° C. with an absorption solution suitable for this purpose and then subsequently the loaded absorption solution is regenerated by heating.

Methods of the above mentioned general type are known in the art. It is known to remove hydrosulfide from a so-called partial oxidation crude gas or other gases by treating the gases with an absorption solution suitable for this purpose. The gas is supplied with a temperature between 10° and 60° C. from above into an absorption column provided with respective inserts, and the absorption solution is fed to the head, so that it flows in counterstream to the gas from above downwardly through the absorption column. The utilized absorption solutions can contain various compounds as effective substances. Especially suitable for the above purpose are for example various amines, glycoles and also N-methylpyrrolidon and propylenecarbonate. The hydrosulfide of the gas is physically dissolved during the washing process in the absorption column in the utilized absorption solution or chemically bonded with the latter. Subsequently, the loaded absorption solution is supplied to a desorption column. In the desorption column the hydrosulfide is driven from the solution by heating at a normal pressure or at reduced pressure. After this, the regenerated solution is supplied to its further utilization.

When these steps were used for treating the partial oxidation crude gas, it was conventional to cool and to purify the crude gas between the gasifier and the absorption column in a series of process steps, so that this gas can be subsequently supplied to the absorption column with a temperature between 10 and 60° C. For example in the magazine "gwf-gas/erdgas", 121 (1980), volume 12, page 545, FIG. 3, a flow diagram for such a gas treatment is presented. Here the crude partial oxidation gas is first cooled in the heating boiler of the gasifier and then supplied through a so-called cooling washer to a mechanical washer and an electrical filter. Then, the cooled and pre-cleaned gas is supplied to the absorption column. In such a process it is however required that heating of the desorption column, in which the regeneration of the loaded absorption solution is performed, be conducted with foreign vapor. It is to be clear that this involves an additional cost factor for the method, which should be eliminated if possible.

SUMMARY OF THE INVENTION

Accordingly, it is an object of the present invention to provide a method of the above mentioned general type, which avoids the disadvantages of the prior art.

More particularly, it is an object of the present invention to provide a method of removing hydrosulfide from partial oxidation gas which is optimized in that the heat quantity which must be withdrawn from the crude gas between the gasifier and the absorption column is used in a better manner.

In keeping with these objects and with others which will become apparent hereinafter, one feature of the present invention resides, briefly stated, in that the pre-cleaned crude gas which is precooled to a temperature of 110°–150° C. is cooled before entering the absorption column in a stepped manner in an indirect heat exchanger with the loaded absorption solution, and the gas first is supplied through a reboiler of the desorption column and then through a heat exchanger serving for a pre-warming of the loaded absorption solution.

When the method is performed in accordance with the present invention, the cooling of the crude gas before the $H_2S$-absorption is coupled with the regeneration of the loaded absorption medium so that for the heating of the desorption column only during starting the installation or deviation of the predetermined standard crude gas conditions a foreign vapor is required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing a flow diagram of a method of removing hydrosulfide from partial oxidation gas in accordance with the present invention.

DESCRIPTION OF THE PREFERRED EMBODIMENT

In accordance with the present invention a method is proposed in accordance with which the pre-cleaned crude gas which is precooled to a temperature of 110°–150° C. is cooled before entering the absorption column in a stepped manner in an indirect heat exchanger with the loaded absorption solution, and the gas first is supplied through a reboiler of the desorption column and then through a heat exchanger serving for a pre-warming of the loaded absorption solution.

For performing the inventive method a partial oxidation crude gas which is pre-cooled to a temperature of 110°–150° C. and precleaned in preceding cooling and cleaning stages, is supplied through a conduit 1 to a reboiler 4 of a desorption column 3. Here, the gas gives away a portion of its heat content in an indirect heat exchange to a loaded absorption solution circulating therein. Subsequently, the gas with a temperature of approximately 100° C. flows through a conduit 5 to a heat exchanger 6. In the heat exchanger 6 the gas is subjected to a further cooling with the loaded absorption solution coming from the absorption column 2. The gas is supplied from the heat exchanger 6 through a conduit 7 into a cooler 8 which is loaded with cooling water. Here the gas is cooled to a temperature of between 10° and 60° C. in indirect heat exchange. With this temperature, the gases supplied through a conduit 9 into the lower part of the absorption column 2. The arrangement of the cooler 8 between the heat exchanger 6 and the absorption column 2 is not required in every case. This cooler can be dispensed with when the gas during discharge from the heat exchanger 6 has a temperature lying in the region between 10° and 60° C. and therefore can be supplied to the absorption column without additional cooling.

In the absorption column 2 the gas is treated with the absorption solution supplied from above through a conduit 10. Thereby the hydrosulfide is removed from the gases.

This treatment can also be performed with the utilization of the absorption column which is described hereinabove and belongs to the prior art. The $H_2S$-free gas discharges through the head from the absorption column 2 and can be supplied through a conduit 11 to a further treatment. Both the absorption column 2 and the desorption column 3 are provided with inserts which are suitable for these purposes.

The loaded absorption solution is withdrawn through a conduit 12 from a sump of the absorption column 2 to the heat exchanger 6 and is heated in the latter to a temperature of 50°–80° C. At this temperature the solution is supplied through a conduit 13 to the upper part of the desorption column 3. Here the taken hydrosulfide is driven from the absorption solution by heating. The $H_2S$ withdrawal can be further improved when the desorption column 3 operates at negative pressure of 0.3–0.8 bar. The $H_2S$-rich oxygen gas withdrawn from the absorption solution is drawn through the head from the desorption column 3 and supplied through a conduit 14 to a cooler 15. In the cooler 15 the condensable components are separated from the oxygen gas. Then the gases supplied through a conduit 16 to a not shown hydrosulfide recovery device. The condensate falling in the cooler 15 is withdrawn through a conduit 17 and supplied to the head of the desorption column 3.

The reboiler 4 which is heated by the partial oxidation crude gas serves, as described hereinabove, for the required heating of the loaded absorption solution in the desorption column 3. In addition, this column is provided with a reboiler 18 which is heated with a foreign vapor and can be used in operation during starting of the installation or during deviation from standard crude gas conditions. Conduits 19 and 20 serve for liquid circulation between the sump of the desorption column 3 and the reboilers 4 and 18, required for the heating of the absorption solution.

The regenerated, $H_2S$-free absorption solution is supplied by a pump 22 arranged in a conduit 21, from the desorption column 3 to a cooler 23. In the cooler 23 the solution is cooled by water cooling to a temperature of approximately 30° C. and then again returned through the conduit 10 to the absorption column 2.

Precipitated gas condensate is withdrawn through a conduit 24 from the boiler 4. Conduits 25 and 26 open into this conduit. The gas condensate is withdrawn from the heat exchanger 6 and the cooler 8 through the conduits 25 and 26.

The operation of the inventive method is explained by the following example. 100,000 m³/h of pre-cleaned partial oxidation crude gas, produced from cold pressure gasifying device operated in accordance with the Prenflo process, is supplied with a temperature of 130° C. and a pressure of 24 bar through the conduit 1 into the above described device. The $H_2S$ removal from the gas in the absorption column 3 is performed by a washing with a methyldiethanolamine containing absorption solution. Thereby, the reboiler 18 is used only during starting of the device. Then the heating of the desorption column 3 is performed exclusively by the reboiler 4 loaded with the partial oxidation crude gas. As a result, with approximately identical investment costs, an energy saving of 1.6 MW is obtained as compared with conventional methods.

It will be understood that each of the elements described above, or two or more together, may also find a useful application in other types of methods differing from the types described above.

While the invention has been illustrated and described as embodied in a method of removing hydrosulfide from partial oxidation gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of removing hydrosulfide from a crude gas produced by partial oxidation of carbon-containing material, comprising the steps of treating a gas at a temperature between 10° and 60° C. with a suitable absorption solution; regenerating the absorption solution loaded during the treating; and cooling the crude gas which has been precleaned and pre-cooled to a temperature of 110°–150° C. before entering an absorption column, in a stepped manner in indirect heat exchange, said cooling including supplying the gas first through a reboiler of a desorption column and then through a heat exchanger which serves for preheating of the loaded absorption solution.

2. A method as defined in claim 1; and further comprising the step of additionally supplying the gas through cooler loaded with the cooling water, after said supplying the gas through the heat exchanger which serves for the preheating of the loaded absorption solution.

3. A method as defined in claim 1; and further comprising the step of operating the desorption column at a negative pressure of 0.3–0.8 bar.

4. A method as defined in claim 1; and further comprising the step of cooling the crude gas in the reboiler of the desorption column to a temperature of 100° C.

5. A method as defined in claim 1; and further comprising the step of heating the desorption column by an additional reboiler loaded with a foreign vapor, during starting a device or during deviation from standard crude gas conditions.

* * * * *